US011850890B2

(12) United States Patent
Murata

(10) Patent No.: US 11,850,890 B2
(45) Date of Patent: Dec. 26, 2023

(54) PNEUMATIC TIRE

(71) Applicant: The Yokohama Rubber Co., LTD., Tokyo (JP)

(72) Inventor: Takahisa Murata, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 931 days.

(21) Appl. No.: 16/478,832

(22) PCT Filed: Jan. 16, 2018

(86) PCT No.: PCT/JP2018/001006
§ 371 (c)(1),
(2) Date: Jul. 17, 2019

(87) PCT Pub. No.: WO2018/135485
PCT Pub. Date: Jul. 26, 2018

(65) Prior Publication Data
US 2020/0055346 A1 Feb. 20, 2020

(30) Foreign Application Priority Data
Jan. 17, 2017 (JP) ................... 2017-006135

(51) Int. Cl.
*B60C 11/01* (2006.01)
*B60C 11/11* (2006.01)
(Continued)

(52) U.S. Cl.
CPC ............. *B60C 11/01* (2013.01); *B60C 11/11* (2013.01); *B60C 13/02* (2013.01); *B60C 2011/1361* (2013.01); *B60C 2200/14* (2013.01)

(58) Field of Classification Search
CPC ..... B60C 11/01; B60C 11/0306; B60C 11/11; B60C 13/02; B60C 13/00; B60C 2011/1361; B60C 2200/14
(Continued)

(56) References Cited

U.S. PATENT DOCUMENTS

D805,469 S  * 12/2017 Sato ............................. D12/605
2003/0041939 A1 * 3/2003 Allison ............... B60C 11/0316
152/209.1
(Continued)

FOREIGN PATENT DOCUMENTS

JP   2000-313206    11/2000
JP   2010-047251    3/2010
(Continued)

OTHER PUBLICATIONS

International Search Report for International Application No. PCT/JP2018/001006 dated Mar. 6, 2018, 4 pages, Japan.

*Primary Examiner* — Justin R Fischer
*Assistant Examiner* — Philip N Schwartz
(74) *Attorney, Agent, or Firm* — Thorpe North & Western

(57) ABSTRACT

Provided is a pneumatic tire. Side blocks are provided at extension positions of shoulder blocks on an inner side in a tire lateral direction, and each of the side block is formed into an L-shape in which a radial portion extending in a tire radial direction and a circumferential portion extending in a tire circumferential direction are coupled in a hook portion. Of the side blocks, first blocks having the circumferential portions oriented to the shoulder block side and second blocks having the radial portions oriented to the shoulder block side form pairs by facing each other so that the circumferential portions of the first blocks and the second
(Continued)

blocks overlap with each other. The side block pairs formed of the first blocks and the second blocks are arrayed in the tire circumferential direction.

9 Claims, 3 Drawing Sheets

(51) Int. Cl.
 *B60C 13/02* (2006.01)
 *B60C 11/13* (2006.01)
(58) Field of Classification Search
 USPC ....................................................... D12/605
 See application file for complete search history.

(56) References Cited

U.S. PATENT DOCUMENTS

| | | |
|---|---|---|
| 2010/0043934 A1 | 2/2010 | Harvey |
| 2012/0216930 A1 | 8/2012 | Matsuda |
| 2013/0139936 A1 | 6/2013 | Ohara |
| 2016/0129733 A1 | 5/2016 | Fujioka |

FOREIGN PATENT DOCUMENTS

| | | |
|---|---|---|
| JP | 2012-179964 | 9/2012 |
| JP | 2013-119277 | 6/2013 |
| JP | 2015-168301 | 9/2015 |
| JP | 2016-088465 | 5/2016 |
| WO | WO 03/020538 | 3/2003 |

\* cited by examiner

PNEUMATIC TIRE

TECHNICAL FIELD

The present technology relates to a pneumatic tire suitable as a tire used for driving on unpaved roads, and particularly relates to a pneumatic tire capable of enhancing driving performance on unpaved roads, cut-resistance performance, and uniformity in a well-balanced manner.

BACKGROUND ART

In general, as a pneumatic tire used for driving on unpaved roads such as an uneven ground surface, a muddy ground surface, a snowy road, a sandy ground surface, and a rocky ground surface, a tire with a tread pattern, which mainly includes lug grooves and blocks with a large number of edge components and a large groove area, is adopted. Such a tire achieves traction performance by biting into mud, snow, sand, ballast, rocks, and the like on road surfaces (hereinafter, collectively referred to as "mud and the like"), and prevents the grooves from being clogged with mud and the like so as to improve driving performance on unpaved roads. Particularly, a tire intended for driving on a rocky ground surface improves driving performance (rock performance) on a rocky ground surface by providing blocks in side regions located further outward in the tire lateral direction than shoulder regions (ground contact edges) (for example, see Japan Unexamined Patent Publication No. 2010-047251).

However, such tire has a large groove area even in shoulder regions and side regions, and hence ballast, rocks, and other foreign material on road surfaces are liable to enter the grooves formed in the shoulder regions and the side regions. As a result, there is a problem in that groove bottoms are liable to be damaged (unsatisfactory cut-resistance performance). Further, the presence and absence of the blocks on the tire circumference form complex recesses and protrusions from the shoulder regions to the side regions. Thus, there is a difficulty in maintaining uniformity. Thus, a measure to improve driving performance on unpaved roads (particularly rocky ground surfaces) by causing the grooves to effectively bite into mud and the like without degrading cut-resistance performance and uniformity and to provide driving performance, cut-resistance performance, and uniformity in a well-balanced manner is required.

SUMMARY

The present technology provides a pneumatic tire suitable as a tire used for driving on unpaved roads, which is capable of providing driving performance on unpaved roads, cut-resistance performance, and uniformity in a well-balanced manner.

A pneumatic tire according to the present technology includes a tread portion extending in a tire circumferential direction and having an annular shape, a pair of sidewall portions disposed on both sides of the tread portion, and a pair of bead portions disposed inward of the sidewall portions in a tire radial direction. A plurality of shoulder blocks, which are disposed at intervals in the tire circumferential direction, are provided in shoulder regions of the tread portion. Side blocks are provided at extension positions of the shoulder blocks in side regions, which are positioned outward of the shoulder regions in a tire lateral direction. The side blocks each have an L-shape in which a radial portion extending in the tire radial direction and a circumferential portion extending in the tire circumferential direction are coupled in a hook shape. The side blocks include first blocks and second blocks. The first blocks each including the circumferential portion oriented on the shoulder block side, and the second blocks each including the radial portion oriented on the shoulder block side. The first blocks and the second blocks form side block pairs by facing each other so that the circumferential portions of the first blocks and the second blocks overlap with each other. The side block pairs formed of the first blocks and the second blocks are arranged in the circumferential direction.

In the present technology, the side blocks are provided at the extension positions as described above. Thus, excellent driving performance on unpaved roads (particularly rock performance) can be exerted. In this case, each of the side blocks has the L-shape, and hence edge components in the circumferential direction and the radial direction of the side block can be increased, which is advantageous in obtaining traction performance on unpaved roads (particularly rocky ground surfaces). Further, the circumferential portions of the side blocks prevent a rock and the like from entering the groove portions between the side blocks adjacent in the tire circumferential direction. Thus, cut-resistance can be improved. Moreover, the circumferential portions of the first block and the second block overlap with each other. Thus, a rigidity difference of the side regions can be reduced, and uniformity can be improved. As a result, driving performance on unpaved roads (particularly rock performance), cut-resistance performance, and uniformity can be provided in a well-balanced and compatible manner.

In the present technology, it is preferred that the shoulder blocks include inner blocks including outer edges in the tire lateral direction on a tread contact surface at positions relatively inward in the tire lateral direction and outer blocks including outer edges in the tire lateral direction on the tread contact surface at positions relatively outward in the tire lateral direction, that the inner blocks and the outer blocks be disposed alternately in the circumferential direction, that the first blocks be disposed at extension positions of the inner blocks, that the second blocks be disposed at extension positions of the outer blocks, and that a maximum circumferential length A of the circumferential portion of each of the first blocks be greater than a maximum circumferential length B of the radial portion of each of the second blocks. By providing the inner blocks and the outer blocks as described above, spaces formed by differences of the positions of the outer edges of the inner blocks and the outer blocks in the tire lateral direction can grip a rock and the like easily, and rock performance can be improved. Further, the first blocks and the second blocks are disposed in accordance with the size relationship of the inner blocks and the outer blocks, and hence uniformity can also be improved.

In this case, it is preferred that tire circumferential positions of the inner blocks disposed on one side of a tire equator correspond to tire circumferential positions of the outer blocks disposed on another side of the tire equator, that tire circumferential positions of the outer blocks disposed on the one side of the tire equator correspond to tire circumferential positions of the inner blocks disposed on the other side of the tire equator, that the inner blocks disposed on the one side of the tire equator and the outer blocks disposed on the other side of the tire equator overlap with each other, and that the outer blocks disposed on the one side of the tire equator and the inner blocks disposed on the other side of the tire equator overlap with each other. By disposing the inner blocks and the outer blocks as described above, the balance of the inner blocks and the outer blocks is uniformed on both the sides of the tire equator. Moreover, the balance of the first blocks and the second blocks that are disposed at the extension positions of the inner blocks and the outer blocks is uniformed, which is advantageous in improving uniformity.

In the present technology, it is preferred that groove bottom projections be provided in side grooves formed between the side block pairs adjacent in the tire circumferential direction, the groove bottom projections projecting from groove bottoms of the side grooves and extend along the side grooves, and that the groove bottom projections have a projection height less than a projection height of the side blocks. With this, the groove bottom projections can protect the groove bottoms of the side grooves, and hence cut-resistance performance can be improved.

In the present technology, it is preferred that the side blocks be provided so as to include at least a region from 30% to 40% of a tire cross-sectional height from an outer diameter position. By disposing the side blocks as described above, the side blocks easily come into contact with a rock and the like during driving on a rocky ground surface and the like, and traction performance by the side blocks can be exerted effectively.

In the present technology, it is preferred that the radial portion of the side block be inclined with respect to the tire radial direction within a range of from 15° to 55°. With this, the shape of each of the side blocks is satisfactory, which is advantageous in providing driving performance on unpaved roads (particularly rock performance), cut-resistance performance, and uniformity in a well-balanced and compatible manner.

In the present technology, the respective dimensions (lengths and angles) are measured when the tire is mounted on a regular rim and inflated to a regular internal pressure, and placed vertically upon a flat surface with a regular load applied thereto. Note that, "road contact surface" of each block is a surface part of each block that actually comes into contact with a flat surface on which the tire is placed under this state, and excludes, for example, chamfered portions that do not actually come into contact. Further, "ground contact edges" are both edges in the tire axial direction under this state. "Regular rim" is a rim defined by a standard for each tire according to a system of standards that includes standards on which tires are based, and refers to a "standard rim" in the case of JATMA (The Japan Automobile Tyre Manufacturers Association, Inc.), refers to a "design rim" in the case of TRA (The Tire and Rim Association, Inc.), and refers to a "measuring rim" in the case of ETRTO (The European Tyre and Rim Technical Organisation). "Regular internal pressure" is an air pressure defined by standards for each tire according to a system of standards that includes standards on which tires are based, and refers to a "maximum air pressure" in the case of JATMA, refers to the maximum value in the table of "TIRE ROAD LIMITS AT VARIOUS COLD INFLATION PRESSURES" in the case of TRA, and refers to the "INFLATION PRESSURE" in the case of ETRTO. "Regular internal pressure" is 180 kPa for a tire on a passenger vehicle. "Regular load" is a load defined by a standard for each tire according to a system of standards that includes standards on which tires are based, and refers to a "maximum load capacity" in the case of JATMA, refers to the maximum value in the table of "TIRE ROAD LIMITS AT VARIOUS COLD INFLATION PRESSURES" in the case of TRA, and refers to "LOAD CAPACITY" in the case of ETRTO.

DETAILED DESCRIPTION

Configurations of embodiments of the present technology will be described in detail below with reference to the accompanying drawings.

Figure 1:
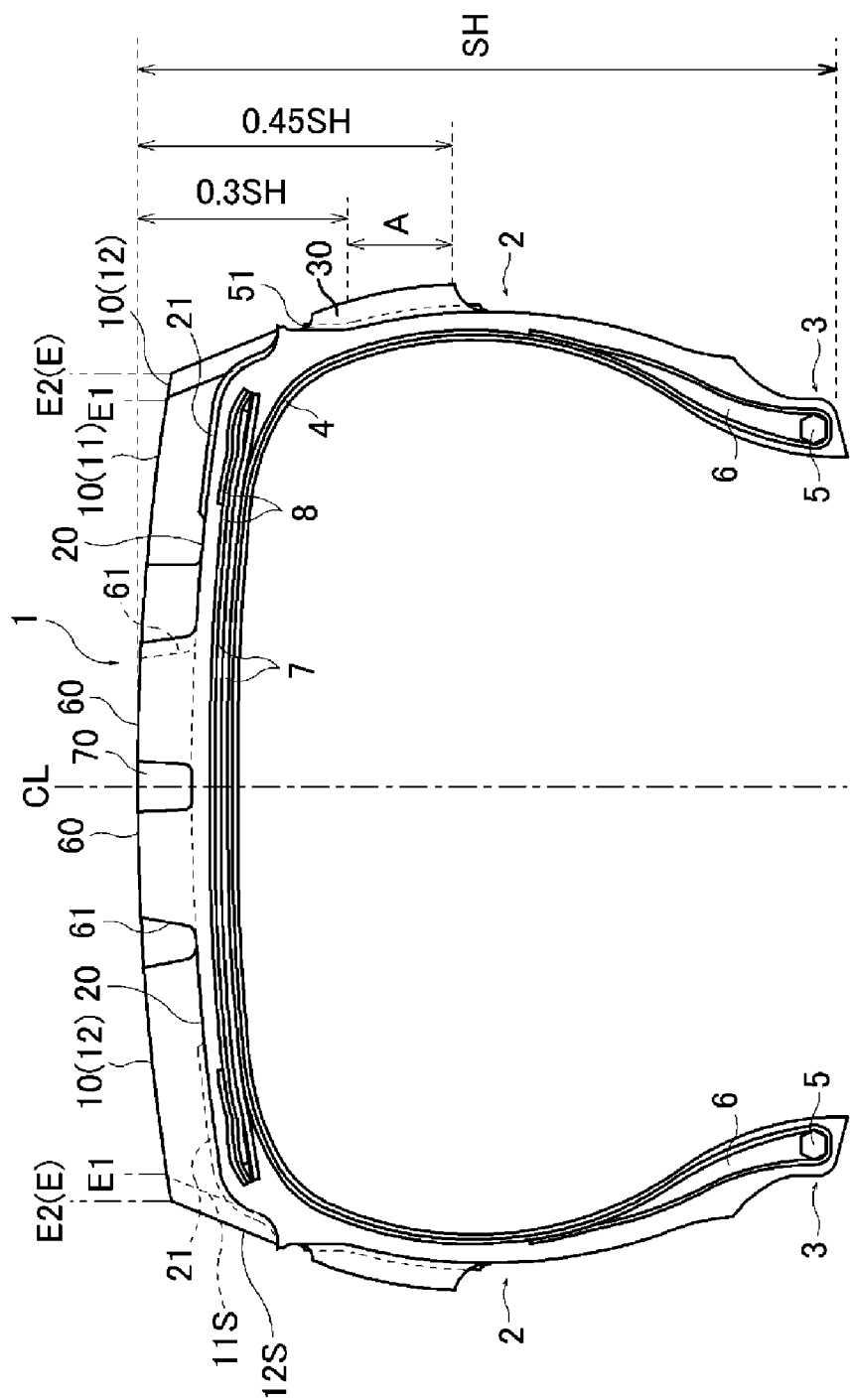
FIG. 1 is a meridian cross-sectional view of a pneumatic tire according to an embodiment of the present technology.

As illustrated in FIG. 1, the pneumatic tire of an embodiment of the present technology includes an annular tread portion 1 extending in the tire circumferential direction, a pair of sidewall portions 2 disposed on both sides of the tread portion 1, and a pair of bead portions 3 disposed inward of the sidewall portions 2 in the tire radial direction. Note that, the reference symbol CL in FIG. 1 denotes a tire equator, and the reference symbol E denotes a ground contact edge.

A carcass layer 4 is mounted between the left-right pair of bead portions 3. The carcass layer 4 includes a plurality of reinforcing cords extending in the tire radial direction and is folded back around a bead core 5 disposed in each of the bead portions 3 from a vehicle inner side to a vehicle outer side. Additionally, bead fillers 6 are disposed on the periphery of the bead cores 5, and each bead filler 6 is enveloped by a main body portion and a folded back portion of the carcass layer 4. Meanwhile, in the tread portion 1, a plurality of belt layers 7 (two layers in FIG. 1) are embedded on the outer circumferential side of the carcass layer 4. The belt layers 7 each include a plurality of reinforcing cords that are inclined with respect to the tire circumferential direction, with the reinforcing cords of the different layers arranged in a criss-cross manner. In these belt layers 7, the inclination angle of the reinforcing cords with respect to the tire circumferential direction ranges from, for example, 10° to 40°. In addition, a belt reinforcing layer 8 is provided on the outer circumferential side of the belt layers 7. The belt reinforcing layer 8 includes organic fiber cords oriented in the tire circumferential direction. In the belt reinforcing layer 8, the angle of the organic fiber cords with respect to the tire circumferential direction is set from, for example, 0° to 5°.

The present technology may be applied to such a general pneumatic tire, however, the cross-sectional structure thereof is not limited to the basic structure described above.

Figure 2:
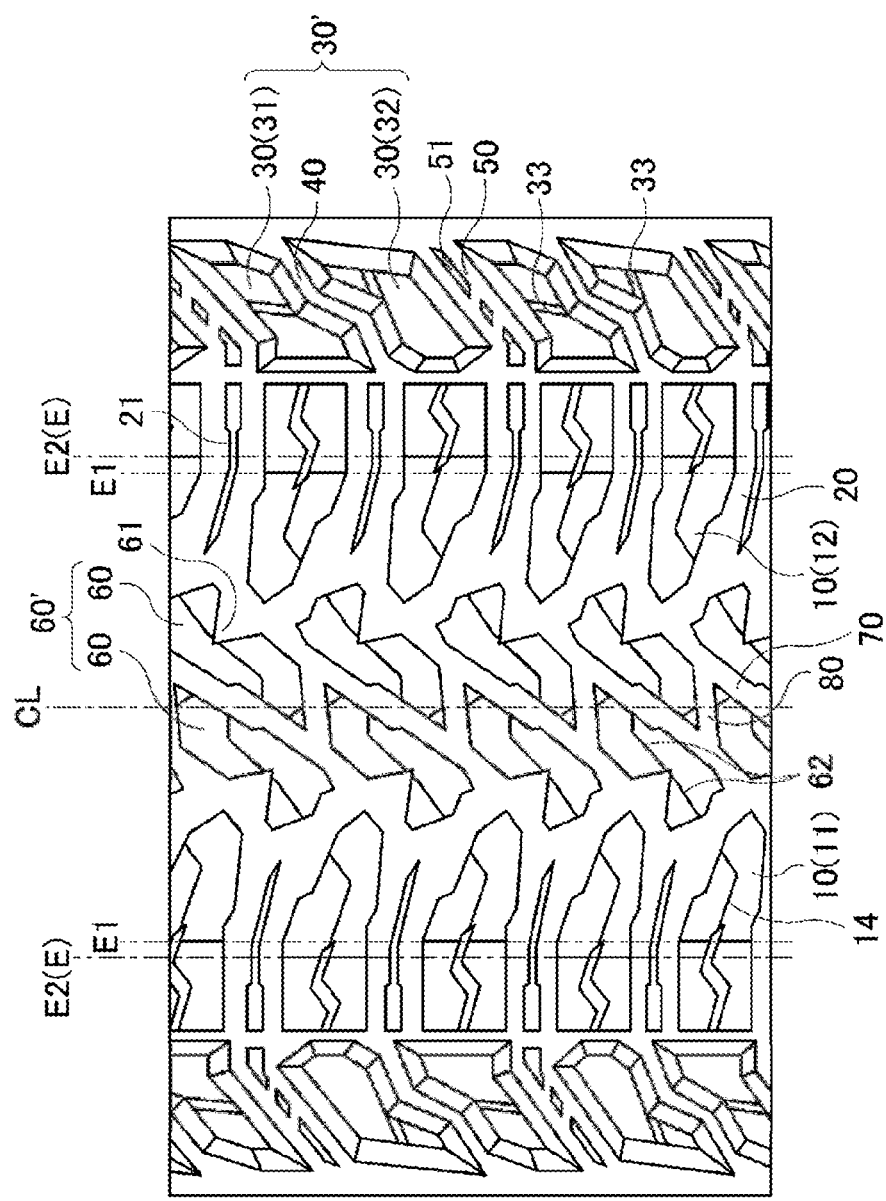
FIG. 2 is a developed view illustrating a tread surface of a pneumatic tire according to an embodiment of the present technology.
Figure 3:
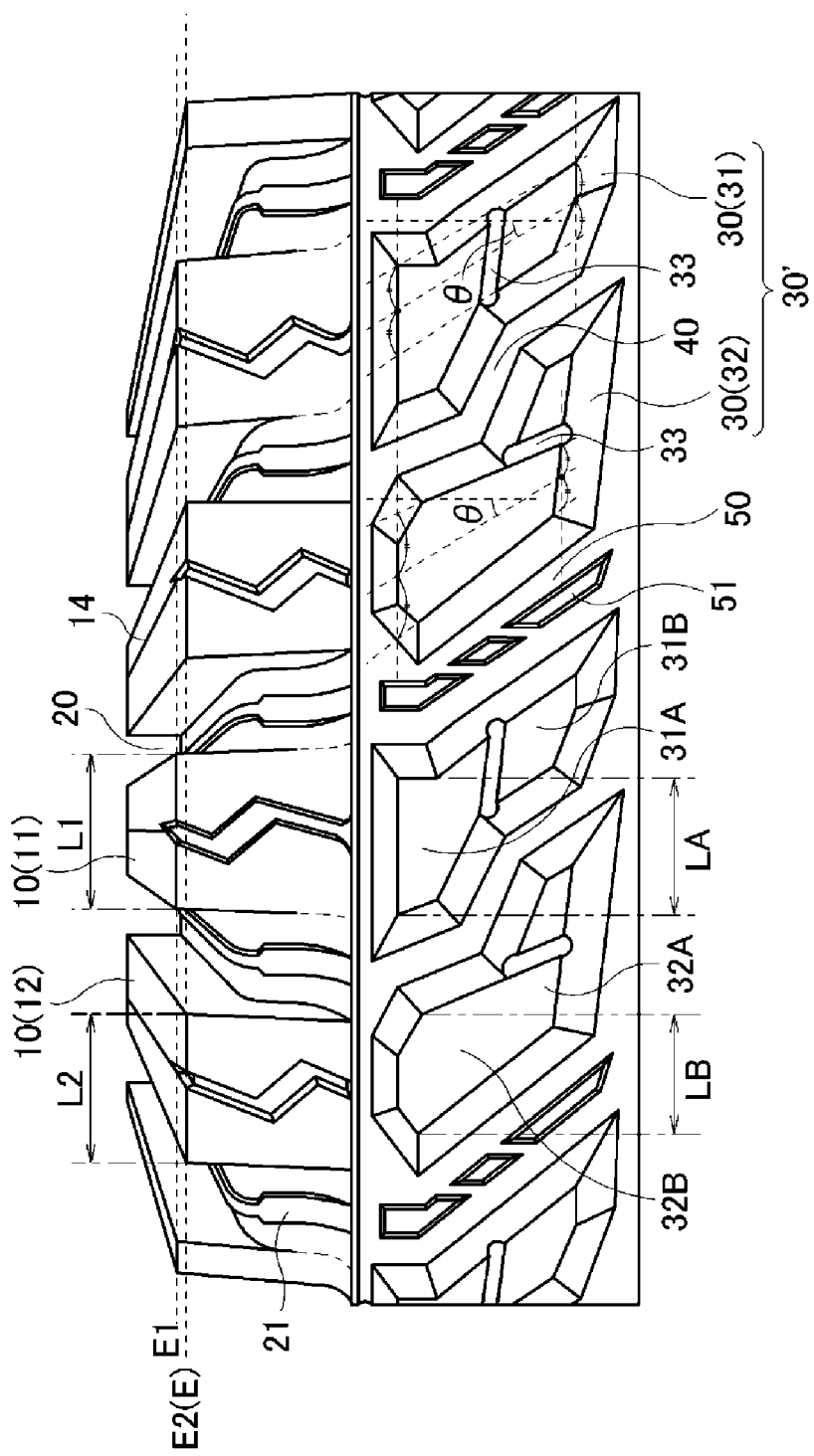
FIG. 3 is a schematic view illustrating of a portion of a shoulder block illustrated in FIG. 2 in an enlarged manner.

As illustrated in FIGS. 1 to 3, in the shoulder regions of the outer surface of the tread portion 1, a plurality of shoulder blocks 10 are provided at intervals in the tire circumferential direction. In the illustrated example, the plurality of shoulder blocks 10 include inner blocks 11 and outer blocks 12 that include outer edges at different positions in a tire lateral direction in a tread contact surface. That is, E1 denotes the outer edges of the inner blocks 11 in the tire lateral direction and E2 denotes the outer edges of the outer blocks 12 in the tire lateral direction, and the outer edges E1 of the inner blocks 11 in the tire lateral direction are positioned further inward in the tire lateral direction than the outer edges E2 of the outer blocks 12 in the tire lateral direction. Note that, in the tread pattern illustrated in FIGS. 1 and 2, the land portions are not present outward in the tire lateral direction from the outer blocks 12. Thus, the outer edges E2 of the outer blocks 12 in the tire lateral direction match with a ground contact edge E of the entire tread portion 1. The inner blocks 11 and the outer blocks 12 are disposed alternately in the tire circumferential direction, and shoulder grooves 20 extending in the tire lateral direction are formed between the inner blocks 11 and the outer blocks 12.

In side regions positioned located outward of the shoulder regions in the tire lateral direction, side blocks 30 (first blocks 31 and second blocks 32 described later) are provided at extension positions of the shoulder blocks 10 described above. Each of the side blocks 30 (the first blocks 31 and the second blocks 32 described later) has an L-shape in which circumferential portions 31A and 32A extending in the tire circumferential direction and radial portions 31B and 32B extending in the tire radial direction are coupled in a hook shape. In the first block 31, the circumferential portion 31A is oriented on the shoulder blocks 10 side. In the second block 32, the radial portion 32B is oriented on the shoulder blocks 10 side. The first block 31 and the second block 32 form a pair (a side block pair 30') so that the circumferential portions 31A and 32A of the first block 31 and the second block 32 overlap with each other. In each of the side block pairs 30', a zigzag groove 40 is formed between the first block 31 and the second block 32 that face with each other (on a side to which the circumferential portions 31A and 32A of the first block 31 and the second block 32 project in the circumferential direction). The circumferential portions 31A and 32A of the first block 31 and the second block 32 project in the circumferential direction, forming the bend in the zigzag groove 40. The side block pairs 30' are arrayed at intervals in the tire circumferential direction, and side grooves 50 are formed between the side block pairs 30' adjacent in the tire circumferential direction.

The side blocks 30 are provided at the extension positions of the shoulder blocks 10 as described above, and hence recesses and protrusions are also formed in the side regions that may come into contact with road surfaces during driving on unpaved roads so as to grip mud and the like. Thus, excellent driving performance on unpaved roads (particularly rock performance) can be achieved. In this case, each of the side blocks 30 has the above-mentioned L-shape, and hence edge components in the circumferential direction and the radial direction of the side block 30 can be increased, which is advantageous in obtaining traction performance on unpaved roads (particularly rocky ground surfaces). Further, the circumferential portions 31A and 32A of the side blocks 30 prevent a rock and the like from entering the groove portions (the zigzag grooves 40) between the side blocks 30 adjacent in the tire circumferential direction. Thus, cut-resistance of the side regions can be improved. Moreover, the circumferential portions 31A and 32A of the first block 31 and the second block 32 overlap with each other. Thus, a rigidity difference of the side regions can be reduced, and uniformity can be improved. As a result, driving performance on unpaved roads (particularly rock performance), cut-resistance performance, and uniformity can be provided in a well-balanced and compatible manner.

In this case, when each of the side blocks 30 does not have the L-shape, edge components in the circumferential direction and the radial direction of the side block 30 cannot be increased, and an effect of improving traction performance on unpaved roads (particularly rocky ground surfaces) cannot be obtained efficiently. Further, when the first blocks 31 and the second blocks 32 are arranged in a combination other than the above-mentioned combination, rigidity balance of the side regions is lost, and hence an effect of improving uniformity cannot be obtained.

In the side block 30 having the L-shape as described above, it is preferred that the radial portions 31B and 32B be inclined with respect to the tire radial direction. Particularly, it is preferred that an angle θ formed by the radial portions 31B and 32B with respect to the tire radial direction falls within a range of from 15° to 55°. By forming the side blocks 30 into the L-shape as described above, the shape of the side blocks 30 is satisfactory, which is advantageous in providing driving performance on unpaved roads (particularly rock performance), cut-resistance performance, and uniformity in a well-balanced and compatible manner. In this case, when the angle θ does not fall within the above-mentioned range, the inclination of the radial portions 31B and 32B is excessively large or excessively small. As a result, the shape of the side blocks 30 cannot be optimized, and balance of an effect of improving driving performance on unpaved roads (particularly rock performance), cut-resistance performance, and uniformity is lost. The circumferential portions 31A and 32A may extend basically along the tire circumferential direction, and may be inclined at an angle within ±20° with respect to the tire circumferential direction.

Note that, the above-mentioned angle θ is measured as in the following. That is, as illustrated in FIG. 3, assume that two straight lines, which are circumscribed with the radial portions 31B and 32B and extend in the tire circumferential direction, and two straight lines, which are circumscribed with the radial portions 31B and 32B and are inclined with respect to the tire radial direction, form a quadrangular circumscribed with the radial portions 31B and 32B. Further, an angle formed by a straight line connecting midpoints of the two sides of the quadrangular, which extend in the tire circumferential direction, with respect to the tire radial direction is measured as the angle θ.

A protrusion height of each of the side blocks 30 may set within a range of from, for example 3 mm to 17 mm. When the protrusion height of the side blocks 30 is less than 3 mm, sufficient recesses and protrusions cannot be formed in the side regions. As a result, rock performance cannot be improved sufficiently. When the protrusion height of the side blocks 30 is greater than 17 mm, the rubber amount of the side regions is excessive. As a result, there may be a risk of affecting driving performance of the tire. Further, there may be a risk in that the side blocks 30 themselves are liable to be damaged.

In a surface of each of the side blocks 30, a shallow groove 33 may be provided as illustrated in the drawing. Particularly, in the illustrated example, at boundaries of the circumferential portions 31A and 32A and the radial portions 31B and 32B, the shallow grooves 33 along the extension direction of the portions positioned on the shoulder block 10 side are formed. Specifically, in the first block 31, at the boundary of the circumferential portion 31A and the radial portion 31B, the shallow groove 33, which extend in the extension direction (that is, the circumferential direction) of the circumferential portion 31A positioned on the shoulder block 10 side, is formed. Meanwhile, in the second block 32, at the boundary of the circumferential portion 32A and the radial portion 32B, the shallow groove 33, which extend in the extension direction (that is, the radial direction) of the radial portion 32B positioned on the shoulder block 10 side, is formed. By providing the shallow groove 33 as described above, edge components of the side regions can be increased, which is advantageous in improving rock performance.

The side blocks 30 may be provided in the side regions located outward of the shoulder regions in the tire lateral direction as described above. Particularly, as illustrated in FIG. 1, it is preferred that the side blocks 30 be provided so as to include at least regions A at a height of from 30% to 40% of a tire cross-sectional height SH from an outer diameter position. In other words, it is preferred that the edges of the side blocks 30 on the tread portion 1 side (the outer edges in the tire radial direction) be disposed at the positions on the tread portion 1 side within 30% of the tire cross-sectional height SH from the outer diameter position, and that the edges of the side blocks 30 on the bead portion 3 side (the inner edges in the tire radial direction) be disposed at the positioned on the bead portion 3 side within 40% of the tire cross-sectional height SH from the outer diameter position. By disposing the side blocks 30 as described above, the side blocks 30 easily come into contact with a rock and the like during traveling on a rocky ground surface and the like, and traction performance by the side blocks 30 can be exerted effectively. The tire radial direction length of the side blocks 30 is not particularly limited as long as the side blocks 30 cover the regions A. It is preferred that the tire radial direction length of the side blocks 30 be set to, for example, from 25% to 50% of the tire cross-sectional height SH.

As described above, in the illustrated example, the shoulder blocks 10 include the inner blocks 11 and the outer blocks 12. In the case where the inner blocks 11 and the outer blocks are arranged as described above, it is preferred that the first blocks 31 be disposed at the extension positions of the inner blocks 11, and that the second block 32 be disposed at the extension positions of the outer blocks 12. By disposing the blocks as described above, the outer edges of the inner blocks 11 in the tire lateral direction are positioned relatively inward, and hence the rubber amount of the inner blocks 11 is reduced as compared to the outer blocks 12. In accordance with this, the circumferential portions 31A, which require a relatively large amount of rubber in the L-shaped first blocks 31, are oriented on the shoulder block 10 side. As a result, the rubber amount is balanced between the inner blocks 11 and the first blocks 31. Meanwhile, the radial portions 32B, which only require a relatively small amount of rubber in the second blocks 32 located on the extension positions of the outer blocks 12, are oriented to the shoulder block 10 side. Thus, the total rubber amount of the inner blocks 11 and the first blocks 31 and the total rubber amount of the outer blocks 12 and the second blocks 32 are even on the circumference, which is advantageous in improving uniformity.

In this case, it is preferred that a maximum circumferential length LA of the circumferential portion 31A of the first block 31 be greater than a maximum circumferential length LB of the radial portion 32B of the second block 32. By setting the dimensions as described above, the above-mentioned effects can be exerted more effectively. Note that, it is preferred that the lengths LA and LB satisfy relationships L1>LA and L2>LB with respect to a lateral length L1 of the inner block 11 and a lateral length L2 of the outer block 12. When the size relationship of the lengths LA and LB is reversed, the inner blocks 11, the outer blocks 12, the first blocks 31, and the second blocks 32 are not balanced sufficiently, and there may be a risk in that an effect of improving uniformity cannot be achieved sufficiently.

Further, when the inner blocks 11, the outer blocks 12, the first blocks 31, and the second blocks 32 are arranged as described above, it is preferred that the circumferential positions of the inner blocks 11 disposed on the one side with respect to the tire equator CL correspond to the circumferential positions of the outer blocks 12 disposed on the other side with respect to the tire equator CL, that the circumferential positions of the outer blocks disposed on the one side with respect to the tire equator CL correspond to the circumferential positions of the inner blocks 11 disposed on the other side with respect to the tire equator CL, that the inner blocks 11 disposed on the one side with respect to the tire equator CL and the outer blocks 12 disposed on the other side with respect to the tire equator CL overlap with each other, and that the outer blocks 12 disposed on the one side with respect to the tire equator CL and the inner blocks 11 disposed on the other side with respect to the tire equator CL overlap with each other. By disposing the inner blocks 11 and the outer blocks 12 as described above, the balance of the inner blocks 11 and the outer blocks 12 is made uniform on both the sides of the tire equator CL. Moreover, the balance of the first blocks 31 and the second blocks 32 that are disposed at the extension positions of the inner blocks 11 and the outer blocks 12 is uniformed, which is advantageous in improving uniformity.

It is preferred that groove bottom projections 51, which project from the groove bottoms of the side grooves 50 and extend along the side grooves 50 as illustrated in the drawing, be provided on the groove bottoms of the side grooves 50. Note that, in the illustrated example, the groove bottom projections in the side grooves extend intermittently along the side grooves 50. By providing the groove bottom projections 51 as described above, the groove bottoms of the side grooves 50 can be protected to improve cut-resistance performance of the side regions, and at the same time, discharge performance of mud and the like can be improved. When the groove bottom projections 51 are provided in the side grooves 50 as described above, it is preferred that a projection height of each of the groove bottom projections 51 be set to a range of from 1.0 mm to 3.0 mm. When the protrusion height is less than 1.0 mm, a difference with the groove bottom of the side groove 50 is substantially lost, and hence cut-resistance performance cannot be obtained sufficiently. When the protrusion height exceeds 3.0 mm, a rock and the like are less likely to enter the side grooves 50, and hence rock performance is less likely to be improved sufficiently.

Note that, groove bottom projections 21, which project from the groove bottoms of the shoulder grooves 20 and extend along the shoulder grooves 20 as illustrated in the drawing, may also be provided optionally on the groove bottoms of the shoulder grooves 20. The groove bottom projections 21 also protect the groove bottoms of the shoulder grooves 20 so as to improve cut-resistance performance of the shoulder regions, and at the same time, exert an effect of improving discharge performance of mud and the like. The protrusion height of each of the groove bottom projections 21 provided in the shoulder grooves 20 may also be set to the range equivalent to that of the groove bottom projections 51 provided in the side grooves 50.

The present technology specifies the structure of the side blocks 30 and the positional relationship with respect to the shoulder blocks 10. Thus, the structure of the outer surface of the tread portion 1 excluding the side regions is not particularly limited. For example, as illustrated in the drawing, zigzag shallow grooves 13, which are bent and extend along the tire lateral direction, may be provided in the side surfaces of the shoulder blocks 10 on the outer sides in the tire lateral direction. Further, on the road contact surfaces of the shoulder blocks 10, sipes 14 extending from the shallow grooves 13 may be provided.

In the illustrated example, a plurality of center blocks 60 in which V-shape cuts 61 and sipes 62 are formed are provided. The center blocks 60 form pairs (block pairs 60') across inclined grooves 70, which extend and incline with respect to the tire circumferential direction. The block pairs 60' are arranged in the tire circumferential direction across connecting grooves 80, which connect the inclined grooves 70 adjacent to each other in the tire circumferential direction and extend the tire lateral direction. With the structure of the center region as described above, the structure of the center region can further improve driving performance on unpaved roads. Even with center blocks arranged differently from the illustrated example or even when land portions (ribs) that continuously extend in the tire circumferential direction are formed in the center region in place of the center blocks, the above-mentioned effect in the shoulder regions of the present technology can be obtained.

EXAMPLE

Twelve types of pneumatic tire including Conventional Example 1, Comparative Example 1, and Examples 1 to 10 are manufactured with a tire size of LT265/70R17, the basic structure illustrated in FIG. 1, and the tread pattern in FIG. 2 as a basic pattern under the following conditions as in Table 1, that is, the shape of the side blocks, presence of overlapping of the circumferential portions of the side blocks, the positional relationships between the inner/outer blocks and the first/second blocks, the size relationship between the length LA of the circumferential portion of the first block and the length LB of the radial portion of the second block (size relationship between lengths LA and LB), the positions of the edges of the side blocks on the tread portion side, the positions of the edges of the side blocks on the bead portion side, the inclination angle θ of the radial portion of the side block with respect to the tire radial direction, presence of the groove bottom projections of the side grooves, and the positional relationship of the inner/outer blocks on the one side/the other side of the tire equator.

With regard to the item "Positional relationship between inner/outer blocks and first/second blocks" in Table 1, the case where the first blocks disposed at the extension positions of the inner blocks is denoted as "Inner-first," the case where the second blocks disposed at the extension positions of the inner blocks is denoted as "Inner-second," the case where the first blocks disposed at the extension positions of the outer blocks is denoted as "Outer-first," and the case where the second blocks disposed at the extension positions of the outer blocks is denoted as "Outer-second." With regard to the item "Positional relationship between inner/outer blocks" in Table 1, the case where the inner blocks on the one side of the tire equator overlapped with the inner blocks of the other side of the tire equator is denoted as "Inner-inner," the case where the inner blocks on the one side of the tire equator overlapped with the outer blocks of the other side of the tire equator is denoted as "Inner-outer," the case where the outer blocks on the one side of the tire equator overlapped with the inner blocks of the other side of the tire equator is denoted as "Outer-inner," and the case where the outer blocks on the one side of the tire equator overlapped with the outer blocks of the other side of the tire equator is denoted as "Outer-outer."

These twelve types of pneumatic tires were evaluated for rock performance, cut-resistance performance, and uniformity by the evaluation methods described below, and the results are also shown in Table 1.

Rock Performance

The test tires were assembled on wheels having a rim size of 17×8.0, inflated to an air pressure of 450 kPa, and mounted on a test vehicle (pickup truck). Sensory evaluation on traction performance and starting performance was performed by a test driver on a rocky ground surface. Evaluation results are expressed as index value with Conventional Example 1 being assigned the index value of 100. Larger index values indicate superior rock performance.

Cut-Resistance Performance

After the evaluation of mud performance and rock performance described above, cut edge lengths of damages caused in the shoulder regions were measured. Evaluation results are expressed as index value with a multiplicative inverse of Conventional Example 1 being assigned the index value of 100. Larger index values indicate smaller cut edge lengths and superior cut-resistance performance.

Uniformity

Under the conditions based on JIS (Japanese Industrial Standard) D4233, the test tires were subjected to a radial force variation test (RFV test), and radial force variation (RFV) was measured. Evaluation results are expressed as index value with a multiplicative inverse of Conventional Example being assigned the index value of 100. Larger index values indicate superior uniformity.

TABLE 1

| | | Conventional Example 1 | Comparative Example 1 | Example 1 | Example 2 |
|---|---|---|---|---|---|
| Side block | Shape | Quadrangular | Parallelogram | L-shape | L-shape |
| | Presence of overlapping | No | Yes | Yes | Yes |
| | Positional relationship between inner/outer blocks and first/second blocks | — | — | Inner-first Outer-second | Inner-second Outer-first |
| | Size relationship between lengths LA and LB | — | — | LA > LB | LA > LB |
| | Positions of edges on tread portion side  % | 20 | 20 | 20 | 20 |
| | Positions of edges on bead portion side  % | 35 | 35 | 35 | 35 |
| | Inclination angle θ  ° of radial direction portion | — | — | 10 | 10 |
| | Presence of groove bottom projections of side grooves | No | No | No | No |
| | Positional relationship of inner/outer blocks | Inner-inner Outer-outer | Inner-inner Outer-outer | Inner-inner Outer-outer | Inner-inner Outer-outer |

TABLE 1-continued

|  |  | | | | |
|---|---|---|---|---|---|
| Rock performance | Index value | 100 | 98 | 103 | 103 |
| Cut-resistance performance | Index value | 100 | 105 | 105 | 105 |
| Uniformity | Index value | 100 | 106 | 106 | 102 |

|  |  | Example 3 | Example 4 | Example 5 | Example 6 |
|---|---|---|---|---|---|
| Side block | Shape | L-shape | L-shape | L-shape | L-shape |
|  | Presence of overlapping | Yes | Yes | Yes | Yes |
|  | Positional relationship between inner/outer blocks and first/second blocks | Inner-first Outer-second | Inner-first Outer-second | Inner-first Outer-second | Inner-first Outer-second |
|  | Size relationship between lengths LA and LB | LA < LB | LA > LB | LA > LB | LA > LB |
|  | Positions of edges on tread portion side % | 20 | 20 | 20 | 25 |
|  | Positions of edges on bead portion side % | 35 | 35 | 35 | 50 |
|  | Inclination angle θ of radial direction portion ° | 10 | 10 | 10 | 10 |
|  | Presence of groove bottom projections of side grooves | No | Yes | Yes | Yes |
|  | Positional relationship of inner/outer blocks | Inner-inner Outer-outer | Inner-inner Outer-outer | Inner-outer Outer-inner | Inner-outer Outer-inner |
| Rock performance | Index value | 103 | 106 | 106 | 108 |
| Cut-resistance performance | Index value | 105 | 107 | 107 | 110 |
| Uniformity | Index value | 104 | 106 | 109 | 107 |

|  |  | Example 7 | Example 8 | Example 9 | Example 10 |
|---|---|---|---|---|---|
| Side block | Shape | L-shape | L-shape | L-shape | L-shape |
|  | Presence of overlapping | Yes | Yes | Yes | Yes |
|  | Positional relationship between inner/outer blocks and first/second blocks | Inner-first Outer-second | Inner-first Outer-second | Inner-first Outer-second | Inner-first Outer-second |
|  | Size relationship between lengths LA and LB | LA > LB | LA > LB | LA > LB | LA > LB |
|  | Positions of edges on tread portion side % | 30 | 25 | 25 | 25 |
|  | Positions of edges on bead portion side % | 40 | 50 | 50 | 50 |
|  | Inclination angle θ of radial direction portion ° | 10 | 15 | 30 | 55 |
|  | Presence of groove bottom projections of side grooves | Yes | Yes | Yes | Yes |
|  | Positional relationship of inner/outer blocks | Inner-outer Outer-inner | Inner-outer Outer-inner | Inner-outer Outer-inner | Inner-outer Outer-inner |
| Rock performance | Index value | 104 | 107 | 107 | 104 |
| Cut-resistance performance | Index value | 106 | 110 | 112 | 113 |
| Uniformity | Index value | 109 | 110 | 112 | 114 |

As is clear from Table 1, in Examples 1 to 10, rock performance, cut-resistance performance, and uniformity were improved as compared to Conventional Example 1. In contrast, in Comparative Example 1, the side block had a parallelogram shape, and the circumferential parts of the adjacent side blocks overlapped with each other. Thus, cut-resistance performance and uniformity were improved, but rock performance was deteriorated as compared to Conventional Example 1.

The invention claimed is:

1. A pneumatic tire, comprising:
   a tread portion extending in a tire circumferential direction and having an annular shape;
   a pair of sidewall portions disposed on both sides of the tread portion; and
   a pair of bead portions disposed inward of the sidewall portions in a tire radial direction;
   wherein a plurality of shoulder blocks, which are disposed at intervals in the tire circumferential direction, are provided in shoulder regions of the tread portion,
   side blocks are provided at extension positions of the shoulder blocks in side regions, which are positioned outward of the shoulder regions in a tire lateral direction, the side blocks each have an L-shape in which a radial portion extending in the tire radial direction and a circumferential portion extending in the tire circumferential direction are coupled in a hook shape, the side blocks include first blocks and second blocks, the first blocks each including the circumferential portion oriented on a shoulder block side, and the second blocks each including the radial portion oriented on the shoulder block side, the first blocks and the second blocks are disposed so as to not overlap with the shoulder blocks in the tire lateral direction, the first blocks and the second blocks form side block pairs by facing each other so that the circumferential portions of the first blocks and the second blocks overlap with each other, and the side block pairs formed of the first blocks and the second blocks are arranged in the circumferential direction.

2. The pneumatic tire according to claim 1, wherein the shoulder blocks include inner blocks and outer blocks, the inner blocks including outer edges in the tire lateral direction on a tread contact surface at positions relatively inward in the tire lateral direction, the outer blocks including outer edges in the tire lateral direction on the tread contact surface at positions relatively outward in the tire lateral direction, the inner blocks and the outer blocks are disposed alternately in the tire circumferential direction, the first blocks are disposed at extension positions of the inner blocks, the second blocks are disposed at extension positions of the outer blocks, and a maximum circumferential length A of the circumferential portion of each of the first blocks is greater than a maximum circumferential length B of the radial portion of each of the second blocks.

3. The pneumatic tire according to claim 2, wherein tire circumferential positions of the inner blocks disposed on one side of a tire equator correspond to tire circumferential positions of the outer blocks disposed on another side of the tire equator, tire circumferential positions of the outer blocks disposed on the one side of the tire equator correspond to tire circumferential positions of the inner blocks disposed on the other side of the tire equator, the inner blocks disposed on the one side of the tire equator overlap with the outer blocks disposed on the other side of the tire equator, and the outer blocks disposed on the one side of the tire equator overlap with the inner blocks disposed on the other side of the tire equator.

4. The pneumatic tire according to claim 1, wherein groove bottom projections are provided in side grooves formed between the side block pairs adjacent in the tire circumferential direction, the groove bottom projections projecting from groove bottoms of the side grooves and extend along the side grooves, and the groove bottom projections have a projection height less than a projection height of the side blocks.

5. The pneumatic tire according to claim 1, wherein the side blocks are provided so as to include at least a region from 30% to 40% of a tire cross-sectional height from an outer diameter position.

6. The pneumatic tire according to claim 1, wherein the radial portion of each of the side blocks is inclined with respect to the tire radial direction within a range of from 15° to 55°.

7. The pneumatic tire according to claim 3, wherein groove bottom projections are provided in side grooves formed between the side block pairs adjacent in the tire circumferential direction, the groove bottom projections projecting from groove bottoms of the side grooves and extend along the side grooves, and the groove bottom projections have a projection height less than a projection height of the side blocks.

8. The pneumatic tire according to claim 7, wherein the side blocks are provided so as to include at least a region from 30% to 40% of a tire cross-sectional height from an outer diameter position.

9. The pneumatic tire according to claim 8, wherein the radial portion of each of the side blocks is inclined with respect to the tire radial direction within a range of from 15° to 55°.

* * * * *